Figure 1:
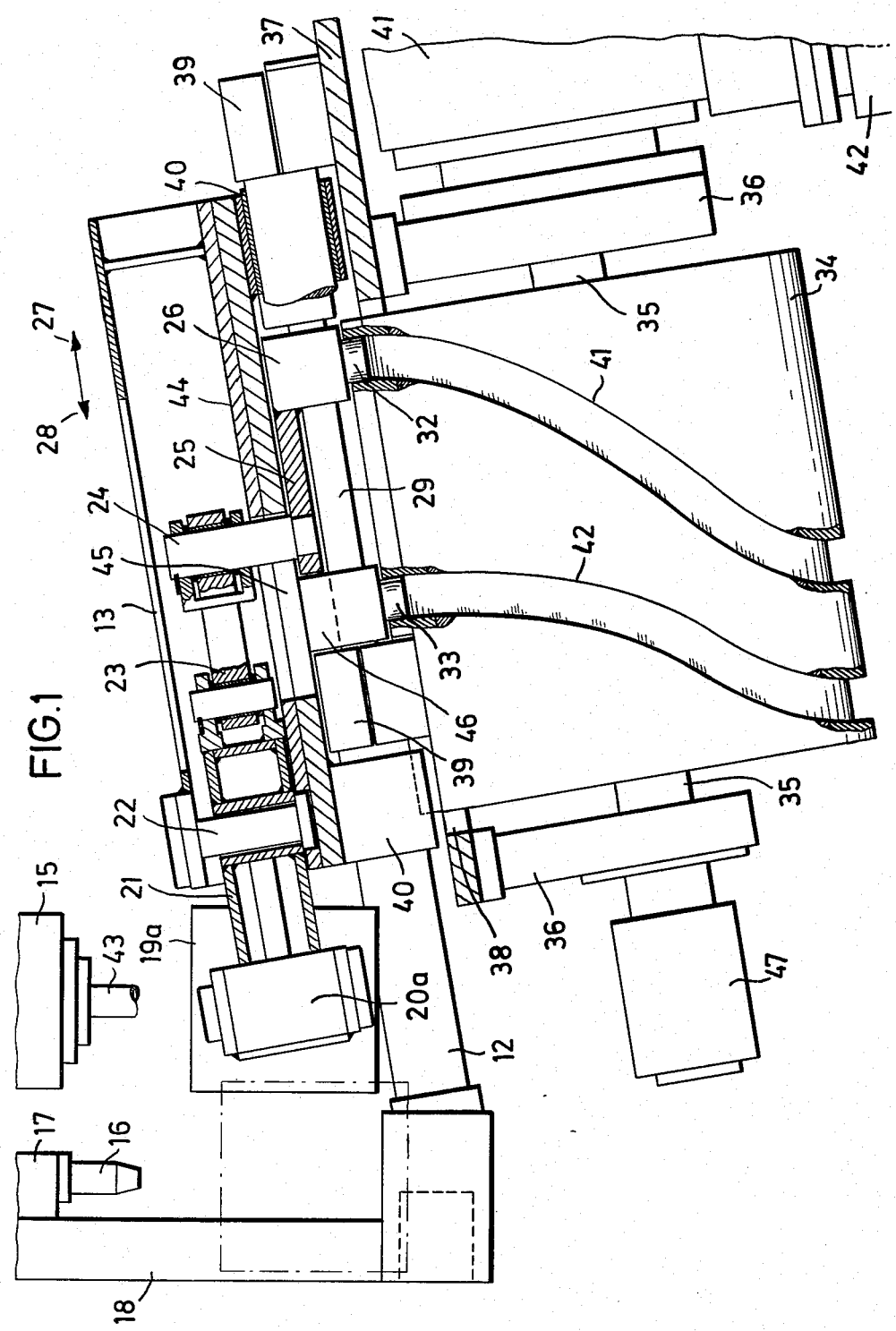

United States Patent [19]
Kiefer et al.

[11] 3,877,861
[45] Apr. 15, 1975

[54] BLOW MOULDING MACHINE WITH CAM CONTROLLED RECIPROCATING CARRIAGE

[75] Inventors: Erich Kiefer, Bonn-Holzlar; Peter Klusener, Bad Godesberg; Dieter Hagen, Widdig, all of Germany

[73] Assignee: Kautex-Werke Reinold Hagen GmbH, Bonn-Holzlar, Germany

[22] Filed: Jan. 30, 1973

[21] Appl. No.: 327,910

[30] Foreign Application Priority Data
Jan. 31, 1972 Germany.............................. 2204395

[52] U.S. Cl....................... 425/387 B; 425/DIG. 205
[51] Int. Cl............................................. B29d 23/03
[58] Field of Search........... 425/DIG. 205, 441, 450, 425/387 B

[56] References Cited
UNITED STATES PATENTS

| | | |
|---|---|---|
| 3,402,431 | 9/1968 | Fogelber, Jr. et al...... 425/DIG. 205 |
| 3,449,481 | 6/1969 | Tahara...................... 425/DIG. 205 |
| 3,624,672 | 11/1971 | Spivy ......................... 425/DIG. 205 |

*Primary Examiner*—Robert D. Baldwin
*Attorney, Agent, or Firm*—Sughrue, Rothwell, Mion, Zinn & Macpeak

[57] ABSTRACT

A blow moulding apparatus including two mould halves 14a, 14b, movable between a first station where a preform is clamped within the mould halves as they are brought together, and a second station where the mould is opened after a compressed air nozzle 16 has been lowered into the closed mould to expand the preform. The mould movements are controlled through a scissors linkage by reciprocating carriage members, which in turn are controlled by cam rollers riding in tracks on a rotating drum.

11 Claims, 2 Drawing Figures

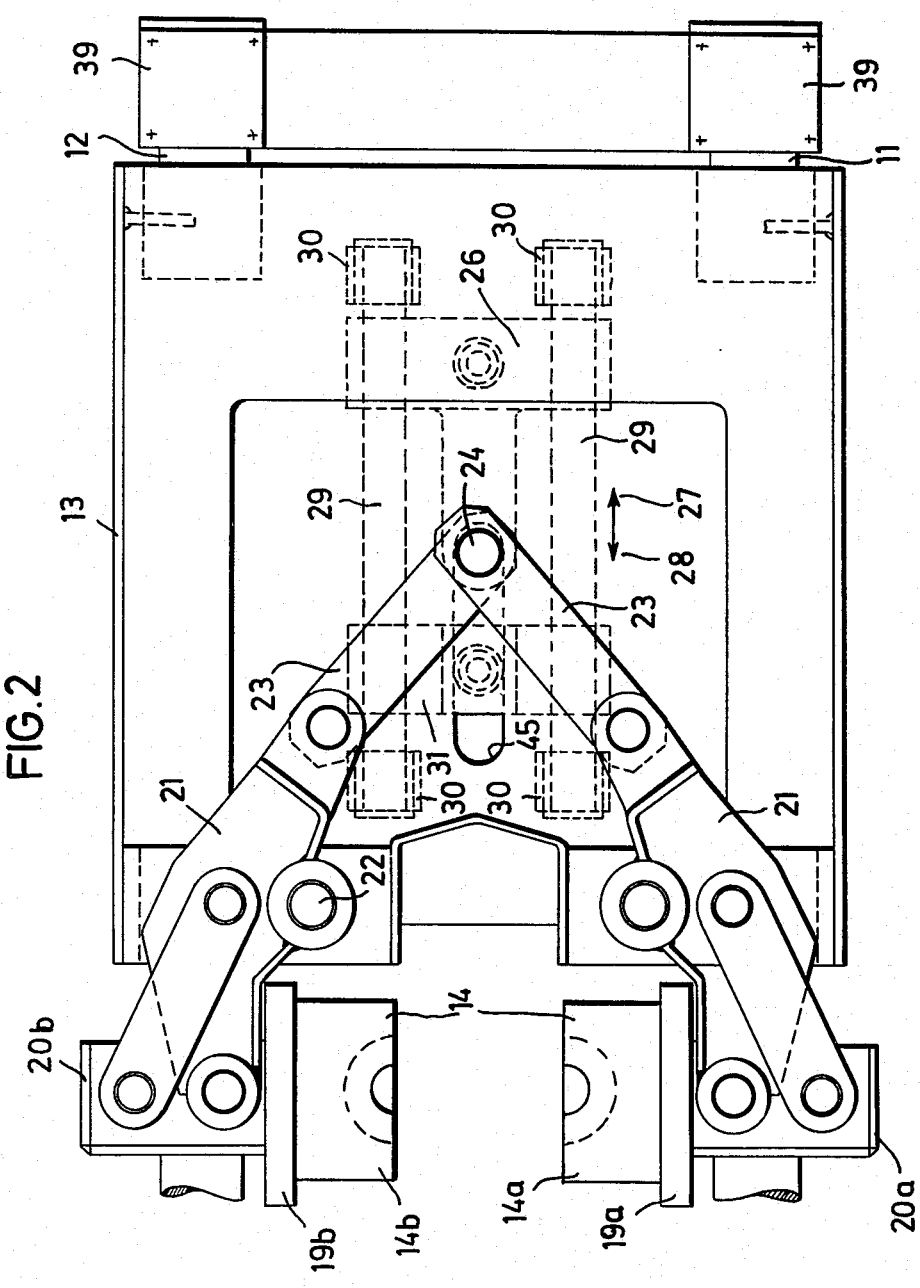

BLOW MOULDING MACHINE WITH CAM CONTROLLED RECIPROCATING CARRIAGE

The invention relates to apparatus for blow moulding hollow bodies, in particular bottles, containers, tubes or the like from thermoplastic synthetic material, of the kind comprising a hollow sectional mould which is preferably moved to and fro along a linear path between a receiving station associated with the extrusion nozzle of an extruder and a mould release station in which the moulded hollow body is removed from the hollow mould.

It is an object of the invention to provide an apparatus of the kind defined having mould moving means which are simple and permit inspection of the apparatus. It is desirable to provide a central drive without, however, the movements of the hollow mould and those of the individual parts of the hollow mould being interdependent such that one movement is directly derived from the other. On the other hand, the invention should provide the possibility of positively synchronizing the individual sequences of movement using simple means, with the object of being able to select the type of opening movement of the hollow mould independently of the shape of the hollow body to be manufactured.

In order to fulfil these objects, the invention firstly proposes that a drive roller provided with at least one cam is provided, with which a cam roller or the like associated with the hollow mould co-operates. Generally one begins with the fact that the parts of the hollow mould are provided with a lever system transmitting closing and opening movements to the latter. In this case the invention also proposes that the drive roller is provided with a control cam, with which a cam roller connected to the lever system co-operates. The lever system is advantageously carried by a reciprocating carriage, according to a further proposal of the invention, a cam roller transmitting the reciprocating movement to the mould being associated with the carriage and a cam roller transmitting the opening and closing movement being associated with the lever system. In this way it is possible, for both movements— i.e. that of the entire mould and that of the parts of the mould — to provide a central drive in the form of the roller with, however, any drive from this roller being taken off separately. In this manner, by means of an appropriate cam shape, a positive synchronization of the movements can be readily achieved, but without — as in the known case described at the beginning — one movement being derived from the other. A further advantage of the invention is that by means of the drive roller it is readily possible to convert a basic rotational drive, which produces the rotation of the drive roller, by means of the latter into reciprocating movements of the mould or parts of the mould. Thus, according to a further proposal of the invention, the arrangement is such that the drive roller is rotated discontinuously. However, it is also possible to provide a continuous movement. The choice between these two possibilities depends essentially on the diameter of the roller and thus on the length of the cams, which correspond to the individual working cycles of the machine.

In one embodiment which has proved particularly advantageous, the carriage is provided with guides, along which is guided an intermediate part, for examples a crossbar, which supports the cam roller associated with the lever system and has a pivot. The guides may be constructed as beams preferably extending parallel to the reciprocating movement. Moreover, the possibility exists of providing on the guides, a second lockable intermediate part, on which is located the cam roller for the reciprocating movement to be imparted to the carriage. By a corresponding adjustment of this intermediate part, for example by moving it on the beams, it is also readily possible to adjust the relative position of the parts with respect to each other depending on the respective facts. The guides may be located below the carriage, the latter being provided with a slot for the passage of the pivot transmitting the movement between the movable intermediate part and lever system.

Furthermore the invention provides the possibility that during the opening movement of the mould parts according to the swing of the latter, the hollow mould may be displaced beyond the mould release station. This is particularly important if the hollow mould parts, i.e. in general the halves of the hollow mould, describe a curved trajectory in the course of their opening and closing movements. In this case, with hollow body cross-sections which diverge from the cylindrical shape, difficulties may result, since in the course of the opening movement, the halves of the hollow mould undergo a certain longitudinal displacement and press against the hollow body still located in the mould release station, for example suspended from the blowing and calibrating pin. Conversely, in the course of the closing movement, in a case of this type, it is possible, that with a large diameter of the generally tubular preform a premature contact between the halves of the hollow mould and the tube occurs. This can be avoided in that the longitudinal component produced in the course of the opening or closing movement of the latter is compensated by a corresponding displacement of the entire mould beyond the mould release station — in the course of the opening movement — or in the direction of the receiving station — in the course of the closing movement.

This displacement, which normally amounts to only a few millimetres, is easily produced when using a drive cam, it being possible without any difficulties or particular expense, to adjust the movements which are very small with respect to their length of travel, very accurately.

Moreover, the invention also provides the possibility that the drive roller is simultaneously provided with means for controlling further functions of the machine, for example the supply of blowing air, actuation of the blowing pin and the like.

The invention will now be further described by way of example only with reference to the drawings, in which:

FIG. 1 is a diagrammatic part sectional side view of one embodiment of blow moulding apparatus in accordance with the invention, and FIG. 2 is a corresponding plan view.

Referring to the drawings, a carriage 13 is movable to and fro on two guide beams 11, 12. At one of its ends the carriage 13 supports, via means to be described, a hollow mould 14, which consists of two mould halves, 14a, 14b.

A vertical extruder has an extrusion head 15 in front of which is a blowing and calibrating pin 16 which can move up and down and is secured to a platform 18 by means of a cylinder 17 effecting the up and down movements, the platform 18 being in turn supported by the two guide beams 11, 12.

The two halves 14a, 14b of the hollow mould are located on clamping plates 19a, 19b which have at their sides remote from the halves of the hollow mould box-like projections 20a, 20b. A pair of two-armed levers 21 have their one ends pivoted on a respective one of the projections 20a, 20b, the pivot axis of rotation being at right-angles to the plane in which the carriage 13 moves to and fro. The two-armed levers 21 are each pivoted on the carriage 13 by means of a respective bearing pin 22. The second arm of each lever 21 is pivotally connected to one end of a respective intermediate lever 23. The two other ends of the intermediate levers 23 pivotally engage a common pivot 24, which is supported by a projection 25 of a cross-bar 26.

The cross-bar 26 is movable in the direction of arrows 27 and 28 along two guides 29. At their ends, the latter have clamping jaws 30, by means of which they are secured to the carriage 13. The guides 29 support a relatively stationary second cross-bar 31, which is detachable from the guides. The cross-bar 26 which moves in the direction of arrows 27 and 28 is provided on its underside with a cam roller 32. The fixed second cross-bar 31 has on its underside a cam roller 33.

Arranged below the carriage 13 is a drive roller 34, which is supported via a shaft 35 by two support beams 36. The latter are fixed to a base plate 37, which is provided with an opening 38 in the vicinity of the drive roller 34. The guide beams 11 and 12 for the carriage 13 are likewise connected to the base plate 37 by clamping jaws 39. The carriage 13 is provided with guide lugs 40, which surround the guides 11 and 12.

The shaft 35 of the drive roller 34 is connected to an electric motor 42 or other appropriate drive means by way of gearing 41.

The drive roller 34 is provided with two cam tracks 41 and 42, the cam roller 32 engaging the cam track 41 and the cam roller 33 engaging the cam track 42. FIG. 1 shows that at least a section of each of the two cam tracks 41 and 42 is at an acute angle with respect to a generatrix of the drive roller 34 so that rotation of the drive roller 34 results in a positive displacement of the two cam rollers 32 and 33, and thus of the parts connected to them, in the direction of the arrow 27 or 28.

In operation of the apparatus, a preferably tubular preform 43 is continuously extruded from the extrusion head 15 and received by the hollow mould 14 located underneath the extrusion head 15 in the receiving station and in the position illustrated in the drawing. Firstly, the hollow mould 14 is opened; the two halves 14a, 14b of the hollow mould are separated as shown in FIG. 2. The reception of the tubular preform by the hollow mould 14 is effected by closing the two halves 14a, 14b of the mould. This closing movement is transmitted by the cam track 41 of the drive roller 34, the associated cam roller 32 and the cross-bar 26 to the lever system consisting of the two levers 21 and the intermediate levers 23. There is thus a displacement of the cross-bar 26 and of the pivot 24 supported thereby in the direction of arrow 28. To allow a relative displacement between the bearing pin 24 and the carriage 13, the base 44 of the carriage 13 is provided with a slot 45. The cross-bar 31 has in the region below the slot 45 a recess 46 into which the projection 25 supporting the bearing pin 24 is moved.

The relative shape of the two cam tracks 41 and 42 is chosen such that during the movement of the cross-bar 26 in the direction of arrow 28, in the course of the closing movement of the two halves 14a, 14b of the mould, no displacement forces are transmitted to the cam roller 33, so that during this period the carriage 13 does not change its position. This means that the section of the cam track 42 corresponding to that section of the cam 41 which effects the closing movement of the mould 14 is at right-angles to a generatrix of the roller 34. After reaching that point on the drive roller, which corresponds to the termination of the closing movement of the mould 14, the cam track 42 causes the cam roller and hence the carriage 13 to be moved in the direction of the arrow 28 whereby the closed mould 14 is moved from the receiving station below the extrusion head 15 to the mould release station associated with the blowing and calibrating pin 16. Thereupon, i.e. after the hollow mould 14 has entered the mould release station, the parts of the hollow mould and the carriage 13 initially retain their positions. During this period the two cam tracks 41 and 42 therefore either have a shape which produces no movement or the drive roller 34 is stationary. After the hollow mould 14 has entered the mould release station, the blowing and calibrating pin 16 is moved downwards, its free end being inserted in customary manner into the upper open end of the tube section located in the hollow mould 14. The preform is then expanded by supplying compressed air to form a hollow body which is allowed to cool whereupon the hollow mould is opened by separation of the halves 14a, 14b of the hollow mould. This is effected by a corresponding displacement of the cross-bar 26 and thus of the bearing pin 24 in the direction of arrow 27, this displacement being caused by an appropriately shaped section of the cam track 41. If the drive roller 34 was at a standstill during the moulding operation it must be restarted before the mould can be opened. Furthermore, the arrangement is such that in the course of or after the completion of the opening movement of the two halves 14a, 14b of the hollow mould, the carriage 13 and thus the hollow mould 14 are returned by an appropriately shaped section of the cam 42 in the direction of arrow 27 to the initial position illustrated in the drawings, in order to receive the next preform in the receiving station. The position of the clamping plates of the hollow mould in the mould release station is illustrated in broken line in FIG. 1 of the drawings.

It is possible to provide the halves of the hollow mould 14 or the associated clamping plates 19a, 19b with transfer grippers in known manner such that these transfer grippers are located in the mould release station when the hollow mould assumes one of its end positions in the receiving station below the extrusion head 15. The transfer grippers engage the hollow body while it is still suspended on the blowing and calibrating pin or an auxiliary pin and transport the hollow body to a subsequent station during movement of the hollow mould from the receiving station to the mould release station.

Since the two halves 14a, 14b of the mould undergo swinging movements during opening and closing difficulties may occur when making hollow bodies of non-cylindrical cross-section owing to the fact that during the opening movement the mould halves press with their sides remote from the carriage 13 against the hollow bodies and possibly displace the latter somewhat. Conversely, this may occur during the closing movement if the preform has a large diameter. These two undesirable possibilities may be obviated by slightly displacing the mould, during opening and/or closing, in the direction of arrow 28 or 27, in order to disengage the halves of the hollow mould from the moulded article still suspended from the blowing pin or from the preform suspended from the extrusion head 15. The drive roller 34 is particularly well suited for imparting such linear movements of the carriage 13 or hollow mould 14 as are required in dependence on the opening and/or closing movements, to these parts.

The drive roller 34 was described above as being used for transmitting forces causing certain movements. In addition to this, it is possible to use the drive roller 34 as a control member. This may, for example be accomplished by locating a drum 47 on the shaft 35. During its rotation the drum acts on certain control means and by means of appropriate switches controls, for example the supply of compressed air. The movements of the blowing and calibrating pin 16 may be controlled in the same manner. Moreover, it is also possible to effect such movements by a direct mechanical linkage with the drive roller, using, for example, a third cam track on the drive roller 34.

While the cam tracks of the drive roller have been described as cooperating with cam rollers, it will be appreciated that it is of course possible to use other machine elements adapted to cooperate with a cam track to achieve the same purpose.

What we claim is:

1. In an apparatus for blow moulding hollow bodies, in particular bottles, containers or the like from thermoplastic synthetic material, having a two piece hollow sectional mould movable between an open and closed position, a first station wherein the synthetic material is extruded into the closed mould and a second station laterally adjacent to said first station wherein the synthetic material is released from the open mould after means for expanding the synthetic material has been brought into contact with the closed mold, the improved means to open and close said mould and to move said mould between said first and second stations comprising:
   a. reciprocating carriage slidingly affixed to a stationary base structure,
   b. mechanical linkage means attaching each mould piece to said reciprocating carriage such that the mould is movable between an open and closed position,
   c. means attached to said mechanical linkage to move said mould between said open and closed positions,
   d. means to move said reciprocating carriage linearly between said first and second stations comprising a drive roller having a cam surface about its periphery, said cam surface being engaged by a follower attached to said carriage such that rotation of said drive roller causes said carriage to reciprocate, and
   e. means to rotate said drive roller.

2. The improved blow moulding apparatus of claim 1 wherein each mould section is mechanically attached by a first link (21) which is pivotably attached to said carriage at approximately its mid point, one end of said first link being pivotably attached to a mould section, the other end of each of said first link being pivotably attached to one end of a pair of second links, (23), the other ends of said second links being pivotably attached to a pin which engages the means for opening and closing said mould sections.

3. The improved blow moulding apparatus of claim 2 wherein the drive roller has a second cam surface about its periphery which engages a member attached to said pin connecting said ends of the second links such that rotation of said drive roller causes the opening and closing of said mould sections as well as reciprocation of said carriage.

4. The improved blow moulding apparatus of claim 3 wherein said member attached to said pin is slidingly attached to a plurality of guide members rigidly affixed to said carriage such that said member may move relative to said carriage.

5. The improved blow moulding apparatus of claim 4 wherein said guide members are affixed to the underside of said carriage, said first links are attached to the top side of said carriage and said pin connecting said second links with said member slindingly attached to said guide rails passes through a slot in said carriage.

6. The improved blow moulding apparatus of claim 4 wherein the longitudinal axes of said guide members are parallel to the direction of movement of said carriage.

7. The improved blow moulding apparatus of claim 6 wherein said projection engaging said cam surface is attached to said guide members.

8. The improved blow moulding apparatus of claim 1 wherein said carriage is slidingly attached to a plurality of spaced, parallel support beams rigidly affixed to a stationary base structure.

9. The improved blow moulding apparatus of claim 8 wherein said support beams also support apparatus to release said synthetic material from said open mould used in said second station.

10. The improved blow moulding apparatus of claim 1 wherein said mould sections are moved past said second station during the opening or closing movement of the mould sections.

11. The improved blow moulding apparatus of claim 1 wherein the rotation of said drive roller controls the operation of the apparatus at the first and second stations.

* * * * *